April 14, 1931.  A. C. PATTON  1,800,700
SHEAVE BLOCK
Filed March 18, 1929   2 Sheets-Sheet 1
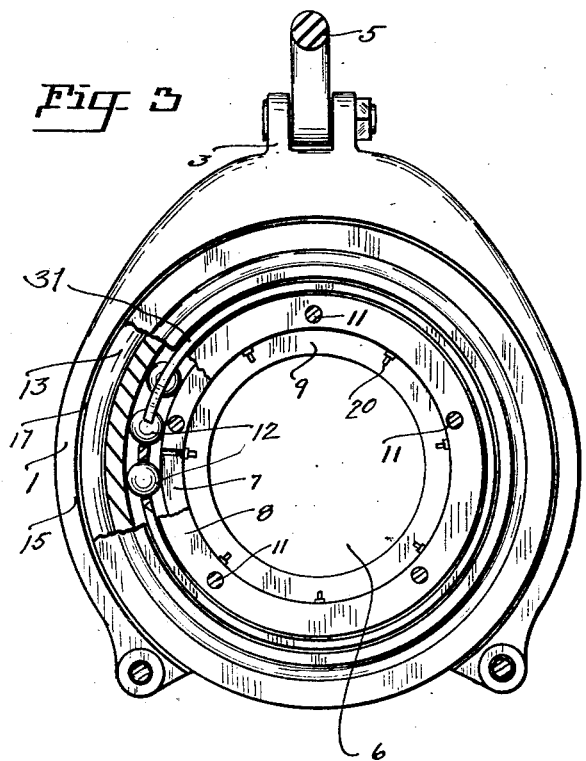
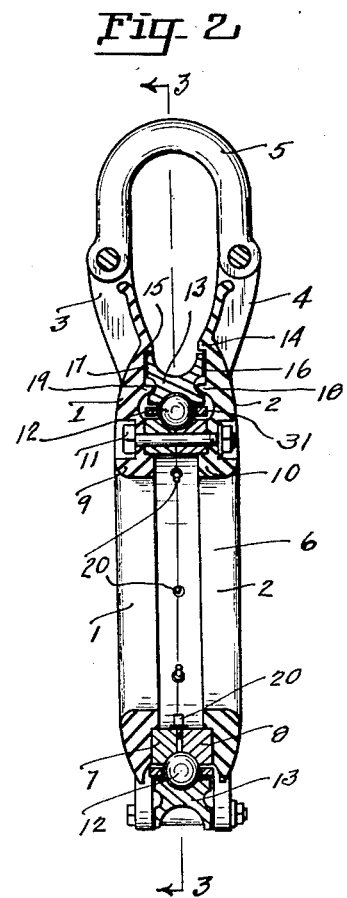
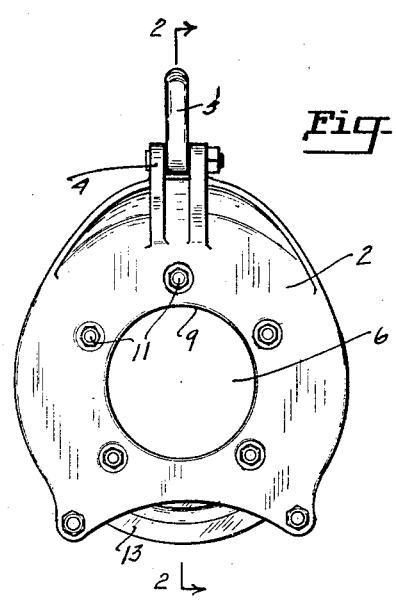
Albert C. Patton
INVENTOR April 14, 1931. A. C. PATTON 1,800,700
SHEAVE BLOCK
Filed March 18, 1929 2 Sheets-Sheet 2

Albert C. Patton
INVENTOR

BY Thomas Billy
ATTORNEY

Patented Apr. 14, 1931

1,800,700

UNITED STATES PATENT OFFICE

ALBERT C. PATTON, OF KNAPPA, OREGON

SHEAVE BLOCK

Application filed March 18, 1929. Serial No. 348,027.

My invention is primarily intended for use in logging equipment and especially for use in the heavy duty logging equipment where heavy cables and lines are being worked under great stresses and where heavy duty, large diameter, free rolling sheaves, are to be placed within the block sides, construction being utilized to create a block of minimum weight.

In the heavy logging operations of the western part of the United States and in Western Canada, extremely large logs are being handled which require extremely heavy operating logging rigging. In such operations the blocks, many times, attain tremendous weights and the handling and the placing of the same becomes a most difficult operation. In addition to the handling of the heavy blocks the maintaining of the same in suitable operating condition is difficult and especially so when they are dragged and handled under adverse operating conditions and where lines and wire ropes are being passed through the blocks that are covered with mud and grit. The deterioration of the blocks and the inefficient operation of the same creates great economic loss.

In my new and improved construction, I form my blocks so as to give a minimum of weight of the block and at the same time create a sheave block having a maximum of diameter of the sheave over which the wire rope passes.

The longevity of the rope somewhat depends upon the diameter of the sheave block about which the wire rope is operated and the larger the wire rope in diameter, the larger the sheave must be.

In my new and improved construction, I place within the block sides an inner stationary frictionless ball bearing race-way that is fixedly secured to the block sides and place a sheave rim within the block side that engages and rolls upon the ball bearings disposed on its inner race-way surface; means being provided within the block sides adapted for preventing the admission of grit and other substances within the ball bearing structure.

A further object of my invention is to provide means for the lubricating of the bearing from a central greasing cylinder disposed within the block sides.

A further object resides in the construction that results in a rigid block that will remain in a suitable operating condition over a relatively long operating period with a minimum of alteration adjustment and repair and with a relatively free operating condition being developed within the block.

With these and incidental objects in view the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 1 is a side view of the assembled block.

Fig. 2 is a cross sectional view, taken on line 2—2 of Fig. 1 looking in the direction indicated.

Fig. 3 is a longitudinal, sectional view, taken on line 3—3 of Fig. 2, looking in the direction indicated.

Like reference characters refer to like parts throughout the several views.

Figure 4:
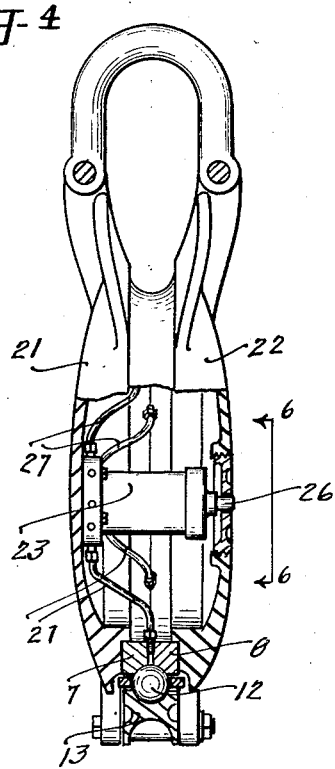
Fig. 4 is a front view, partically in section, of a fabricated block made more particularly to illustrate a preferred means of lubricating the structure.
Figure 5:
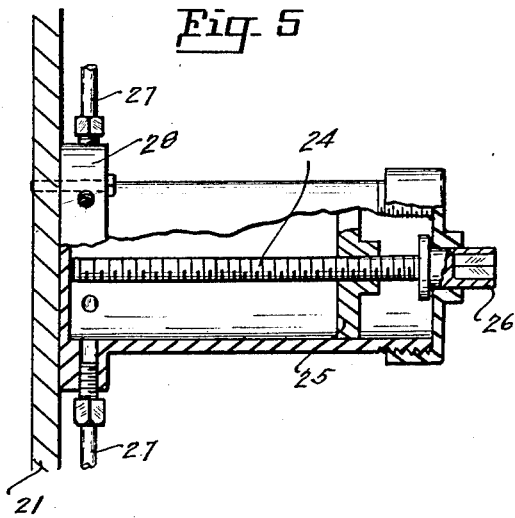
Fig. 5 is a fragmentary, sectional, side view of the lubricating elements disposed central of the block.
Figure 6:
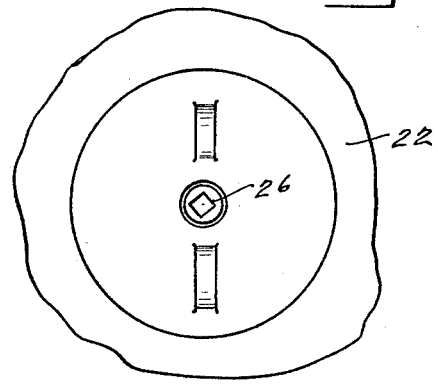
Fig. 6 is a fragmentary, side view as illustrated in Fig. 4, the same being taken on line 6—6 of Fig. 4, looking in the direction indicated.
Figure 7:
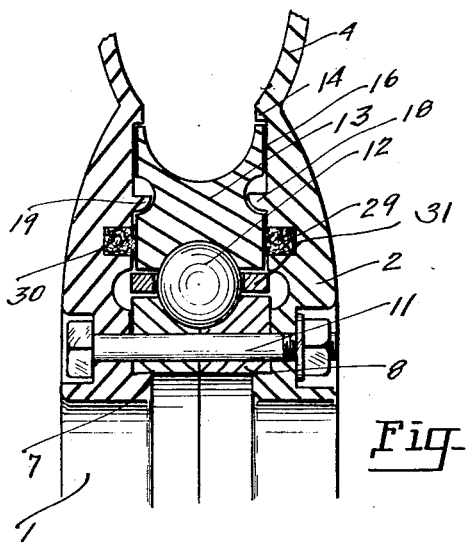
Fig. 7 is a fragmentary, sectional, side view of the engaging ball bearing sheave rim and race and illustrating means disposed within the block sides for preventing the admission of grit and the like within the ball race-ways.

I preferably form the block, as illustrated in Figs. 1, 2 and 3 wherein the block is composed of side walls 1 and 2, having upwardly extending ears 3 and 4, and having a shackle 5 removably secured to the block side members. The side blocks have central aligned openings 6. Retaining shoulders 9 and 10 inwardly extend from the side blocks. A split ball bearing race-way composed of two parts 7 and 8 is disposed upon the shoulders 9 and 10 disposed within the side walls of the block sides upon which the inner raceways 7 and 8 rest. A plurality of bolt openings are disposed in registerable alignment through the block sides adapted to have bolts 11 disposed therein. Depressions are formed within the block sides about the outer periphery of each bolt opening in order to keep the bolt heads and fastening means, such as nuts, confined within the same surface plane as that of the side blocks. A plurality of ball bearings 12 are disposed within the raceway. A ball bearing retaining ring 31 is disposed between the inner and outer race-ways and maintains the ball bearings in spaced relationship with each other. A rim 13 is disposed within the side wall members of the block sides having a race-way disposed upon its inner periphery into which the ball bearings operate. Outwardly extending checks 14 and 15 are disposed at either side of the block sides and extend inwardly therefrom to form annular grooves 16 and 17 within the inner surface of the block sides against which the outerside walls of the rim 13 are disposed. Inwardly extending annular lips 18 and 19 are disposed upon the inner side of each of the block sides to engage within an annular groove disposed within the rim 13. The purpose of the annular lips is to prevent the admission of grit within the ball bearings. The centrifugal force created by the velocity of the sheave rim tends to prevent the accumulation of grit within the housing for the ball bearings. Pressure grease cups 20 are disposed at the inner periphery of the inner race-ways for facilitating the admission of lubricating grease under pressure within the race-ways; in the larger sizes of blocks the side walls 21 and 22 have a lubricating cylinder 23 secured to one of the side walls of the block side and a threaded stem 24 is disposed within the cylinder 23 into which the piston 25 is reciprocably disposed by the threading of the stem through the piston. Lubricating material is placed within the cylinder 23 and is exuded therefrom by the movement of the piston. The piston is moved longitudinally of the cylinder by the outwardly extending head 26 into which a suitable wrench may be placed for actuating the threaded stem. A plurality of pipes 27 extend outwardly from the head 28 of the cylinder and conduct the lubricating material from the cylinder to the interior of the race-way in which the ball bearings are disposed. The cylinder 23 is maintained and protected within the space disposed within the block sides, as illustrated in Fig. 4. In the larger size of blocks, the admission of deteriorating elements is further prevented by the placing of felt washers 29 and 30 within the block sides, the washers being made to engage the outer surface of the rim of the sheave.

While the form of mechanism herein shown and described is admirably adapted to fulfill the objects primarily stated, it is to be understood that it is not intended to confine the invention to the one form of embodiment herein shown and described, as it is susceptible of embodiment in various forms all coming within the scope of the claims which follow.

What I claim is:

1. A ball bearing block comprising companion block sides, retaining shoulder inwardly extending from each of the block sides, a split inner raceway, each part being disposed about the shoulder, a sheave ring having a groove raceway disposed within its inner surface being disposed between the companion block sides, an annular ball bearing ring disposed between the inner raceway and sheave ring, and a plurality of ball bearings disposed within the annular retaining ring and being disposed between the sheave ring and the inner raceway.

2. A ball bearing block comprising companion block sides each having central cut out sections disposed therethrough and depressions disposed on the outside thereof, bolt openings disposed through the block sides within the depressions, oppositely disposed complementary shoulders extending inwardly from each of the block sides, an inner split race-way disposed about said shoulders, having central cut-out sections directly aligned with the central cut out sections within the block sides, bolt openings disposed through said inner split race-way in registerable alignment with the openings disposed through the block sides, through bolts disposed through the openings and securing the inner race-way and the side blocks rigidly together, the bolts being maintained flush with the outer surface of the side blocks with the heads and nuts of the bolts being disposed within the depressions, a sheave ring having a groove disposed in its inner periphery disposed between the block sides, a ball bearing retaining ring disposed between the inner race-way and sheave ring, and ball bearings disposed within the retaining ring.

ALBERT C. PATTON.